Feb. 28, 1956 D. FARJON 2,736,213
COMBINATION PLANETARY GEAR AND FLUID BRAKE TYPE TRANSMISSION
Filed Jan. 9, 1953 2 Sheets-Sheet 1

INVENTOR.
David Farjon,
BY Victor J. Evans & Co.
ATTORNEYS

Feb. 28, 1956 D. FARJON 2,736,213
COMBINATION PLANETARY GEAR AND FLUID BRAKE TYPE TRANSMISSION
Filed Jan. 9, 1953 2 Sheets-Sheet 2
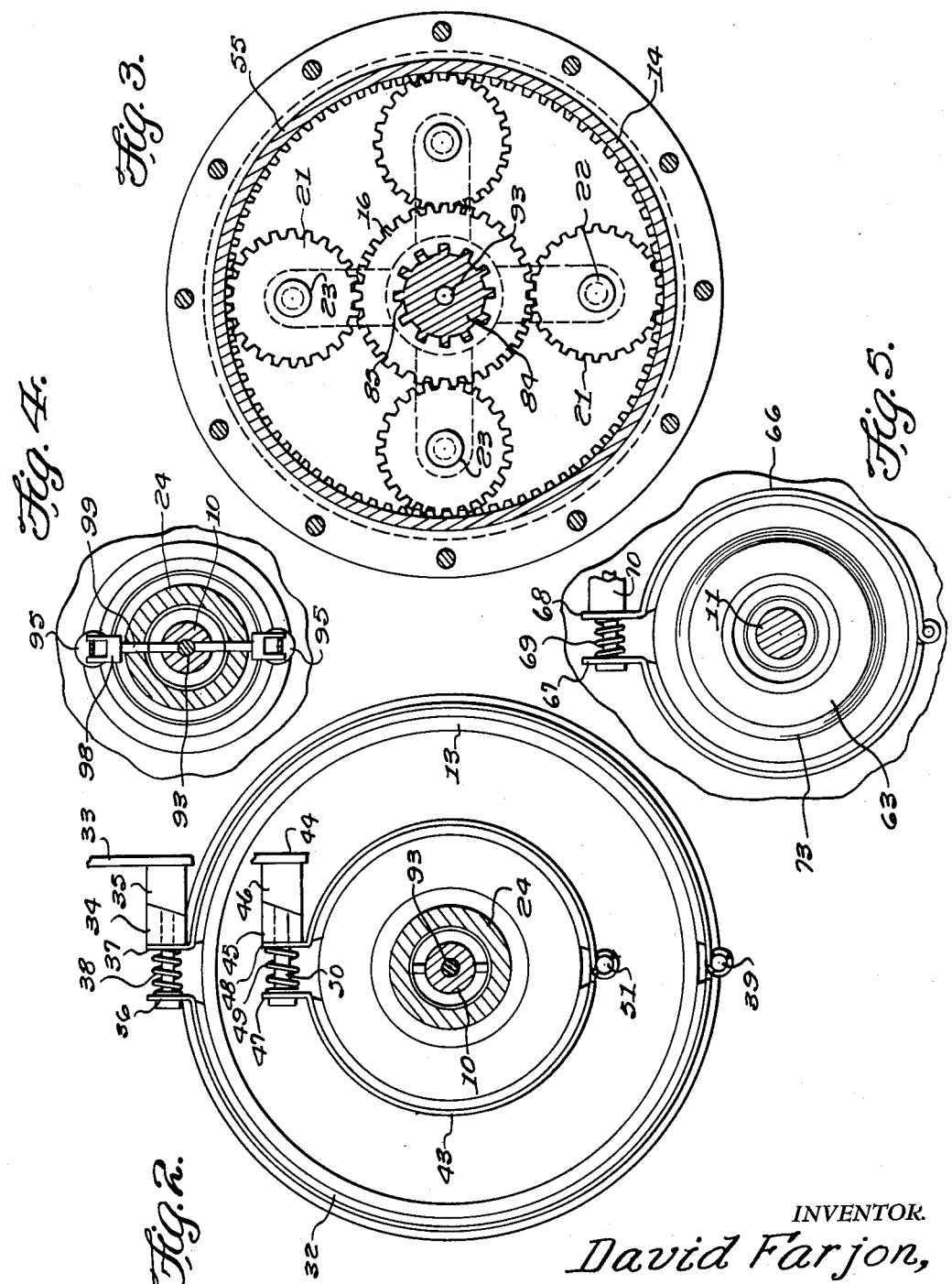
INVENTOR.
David Farjon,
BY Victor J. Evans & Co.
ATTORNEYS ns Patent Office 2,736,213
Patented Feb. 28, 1956

2,736,213

COMBINATION PLANETARY GEAR AND FLUID BRAKE TYPE TRANSMISSION

David Farjon, Willemstad, Curacao, Netherlands Antilles

Application January 9, 1953, Serial No. 330,515

6 Claims. (Cl. 74—752)

This invention relates to a motor vehicle transmission of the automatic type in which speeds are changed without shifting gears, and in particular a transmission wherein a driving shaft is coupled to a driven shaft through coupled sets of planetary gears and a brake of the fluid type.

The purpose of this invention is to provide a progressive type transmission wherein gears remain in mesh continuously and in which the speeds are changed with a differential action.

Various types of so called automatic transmissions have been provided with some using fluid clutches and some planetary gears and whereas the different arrangements are satisfactory to a certain extent it has been found that a combination of a fluid brake with sets of planetary gears provides a more efficient transmission. With this thought in mind this invention contemplates a transmission having a driving shaft directly connected to a center gear of a planetary gear assembly with a driven shaft connected to a center gear of a parallel planetary gear assembly, with ring gears connecting the gears of the planetary gear assemblies, with a fluid brake for holding the pinion carrier of the first gear assembly and with brakes positioned to grip elements of the transmission for retarding rotation of parts of the assembly and also for holding parts thereof stationary.

The object of this invention is to provide means for combining planetary gear assemblies with a fluid type brake and holding elements whereby a driven shaft is progressively rotated by a driving shaft by holding elements and without shifting gears.

Another object of the invention is to provide a flexible connection between a driving and driven shaft wherein the driven shaft is rotated at the same speed as that of the driving shaft or at different speeds in relation to the driving shaft.

A further object of the invention is to provide a combination planetary gear assembly and fluid brake unit which is of a comparatively simple and economical construction.

With these and other objects and advantages in view the invention embodies a transmission unit having a driving shaft, a driven shaft alined with the driving shaft, spaced planetary gear assemblies on adjacent ends of the driving and driven shafts, ring gears positioned in opposite sides of a cylindrical element with one of the ring gears meshing with the gears of the planetary gear assembly of the driving shaft and the other with the planetary gear assembly of the driven shaft, a fluid type brake positioned around the driving shaft, a sleeve journaled on the driving shaft and having an element positioned in the fluid brake assembly and also having a spider on the arm to which pinions of the planetary gear assembly on the driving shaft are journaled, a brake positioned to hold a housing of the fluid brake stationary, a sleeve journaled on the driven shaft and having arms on which pinions of the planetary gear assembly of the driven shaft are journaled and having a brake band on the opposite end, and brakes for holding the planet carriers of the planetary gear assemblies stationary.

Other features and advantages of the invention will appear from the following description taken in connection with the drawings wherein:

Figure 2 is a cross section through the transmission taken on line 2—2 of Figure 1.

Figure 3 is a cross section through the planetary gear assembly taken on line 3—3 of Figure 1.

Figure 4 is a cross section taken on line 4—4 of Figure 1 showing a governor on the intermediate portion of the transmission.

Figure 5 is a cross section taken on line 5—5 of Figure 1 showing a brake for holding the planet carriers of the planetary gear assembly of the driven shaft.

Figure 1:
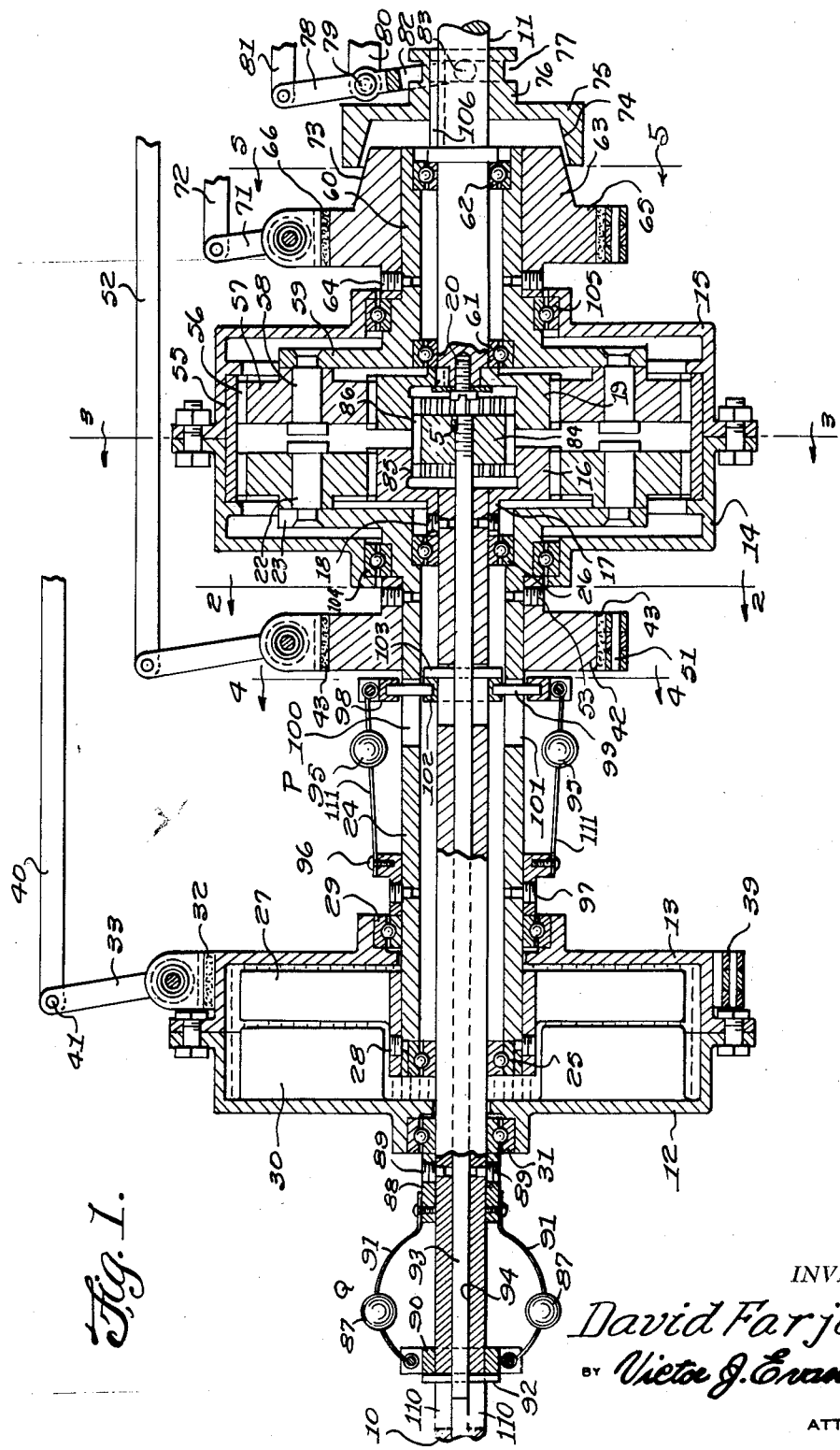
Figure 1 is a longitudinal section through the improved transmission unit.

Referring now to the drawings wherein like reference characters denote corresponding parts the improved transmission of this invention includes a driving shaft 10, a driven shaft 11, a fluid type brake housing including sections 12 and 13 and a planetary gear assembly housing including sections 14 and 15.

The driving shaft 10 extends through the fluid type brake and into the planetary gear housing with a sun gear 16 having a hub 17 fixedly mounted on the shaft and secured in position with set screws 18.

The inner end of the driven shaft 11 is provided with a sun gear 19, similar to the gear 16 and the gear 19 is secured to the end of the shaft 11 with a set screw 20.

The sun gear 16 meshes with pinions 21 journaled by pins 22 in arms 23 extended from a sleeve 24 in which the shaft 10 is journaled with bearings 25 and 26.

An impeller 27 of the fluid type brake is fixedly mounted on the end of the sleeve 24 that extends into the brake housing. The impeller 27 is secured to the sleeve 24 with set screws 28 and the sleeve is journaled in the section 13 of the brake housing with a ball bearing 29.

The impeller 27 is positioned to coact with vanes or blades 30 on the inner surface of the section 12 of the brake housing and the section 12 is journaled on the shaft 10 with a bearing 31.

The brake elements 27 and 30 are illustrated as vanes, such as of a fluid brake, however, it will be understood that these elements may represent a conventional friction brake or one element may be controlled by the other with the electro-magnet or a magnetic brake or by a combination of fluid with powdered iron or the like wherein the fluid is stiffened by the force of electro-magnets.

The outer surface of the section 13 of the brake housing is fitted to provide a brake drum and a brake band 32, positioned around the drum is actuated by a lever 33 through coacting cams 34 and 35 whereby flanges 36 and 37 on the ends of the brake band 32 are drawn together to grip the brake housing. The flanges 36 and 37 are resiliently urged apart by a spring 38 and the brake band 32 is provided in two sections with the sections pivotally connected by a pin 39. The extended end of the lever 33 is pivotally connected to a rod 40 with a pin 41.

The sleeve 24 which carries the planetary gear pinions 21 is also provided with a brake drum 42 with a brake band 43 actuated by a lever 44 through cams 45 and 46 that draw flanges 47 and 48 on the ends of the band 43 together to grip and hold the sleeve and planet carriers. A spring 49 is positioned around a bolt 50 extended through the flanges 47 and 48 and the brake band 43 is provided in two sections, the sections being pivotally connected with a pin 51. The lever 44 is actuated by a rod 52 that may extend to an operating lever in a suitable position in a vehicle in which the transmission is used. The brake drum 42 is secured to the sleeve 24 with set screws 53.

The pinions 21 of the planetary gear assembly on the drive shaft mesh with a ring gear 54 in one side of a cylindrical member or ring 55 and a smiliar gear 56 is provided in the opposite side of the ring or cylinder. The gear 56 meshes with pinions 57 pivotally mounted by pins 58 on arms 59 extended radially from a sleeve 60 that is journaled by bearings 61 and 62 on the driven shaft 11.

A hub 63 is secured to the sleeve 60 with set screws 64 and the outer surface of the hub provides a brake drum 65 upon which a brake band 66 is positioned. The brake band 66 is provided with flanges 67 and 68 and the flanges, which are urged apart by a spring 69, are drawn together by cams including a cam 70, similar to the cams 34 and 35, the cams being actuated by a lever 71 from which a rod 72 extends.

The hub 63 is provided with a frustro-conical shaped surface 73 that coacts with a correspondingly shaped surface 74 of a flange 75 which is slidably mounted on the driven shaft 11 through a hub 76 in which an annular groove 77 is provided. The flange 75 is actuated by a lever 78 that is pivotally mounted by a pin 79 on a stationary part 80 of a vehicle and the extended end of lever 78 is actuated by a rod 81. The lower end of the lever 78 is provided with a yoke 82 that straddles the collar or hub 76 and that is provided with pins 83 that extend into the annular slot 77.

A direct connection is provided between the driving and driven shafts wherein a gear 84 meshes with internal gears 85 and 86 for driving both sections of the shaft in the same direction and at the same speed. The position of the gear 84 is controlled by a governor Q having weights or balls 87, a fixed collar 88 on one end which is secured by set screws 89 to the driving shaft 10, and a collar 90 on the opposite end and to which spring arms 91 are connected. The collar 90 is positioned to engage a pin 92 which extends through slots 110 in the shaft 10 and through the end of a rod 93 in a centrally positioned longitudinally disposed opening 94 of the shaft 10. The opposite end of the rod 93 is threaded into the gear 84 and the parts are secured by a key 5. It will be seen that as the speed of the drive shaft increases the spring arms of the governor spread thereby drawing the collar 90 away from the pin 92 and in a direction away from the engine or motor.

A reduction in the speed of the shaft 10 results in the spring arms 91 straightening out and the force of the spring arms is sufficient to bend the spring arms 111 of the governor P, moving the pin 92 toward the motor and thereby withdrawing the gear 84 and disconnecting the gears 16 and 19.

The movement of the rod 93 is controlled by a governor P having balls 95 and a collar 96 at one end of the governor is secured to the sleeve 24 with set screws 97. A collar 98 at the other end of the governor is slidably mounted on the sleeve 24 and the collar 98 is provided with pins 99 that extend through slots 100 and 101 and into a collar 102 that is positioned to engage a pin 103 which extends through the rod 93.

In the reduction of the speed of the sleeve 24 the spring arms 111 of the governor P push the pin 103, moving the gear 84 into the gear 19 thereby connecting the gears 16 and 19.

The sections 14 and 15 of the planetary gear housing are journaled by bearings 104 and 105, respectively on the sleeves 24 and 60.

With the parts assembled in this manner the brake band 32, which is fixedly mounted in the chassis or body of the vehicle is loose and as the motor is started, the brake band 66 is in gripping relation with the hub 65 and the brake elements 63 and 75 are loose. The hub portion 76 of the brake including the parts 63 and 75 is secured by a key 106 to the driven shaft 11 whereby the part 75 rotates with the shaft.

The motor rotates the shaft 10 with the sun gear 16 which is fixedly mounted on the shaft and the gear 16 rotates the pinions 21 which are journaled on the arms 23 of the sleeve 24 whereby the sleeve rotates at one half of the revolutions of the shaft 10. The parts 27, 30 and 12 will rotate at the same speed as that of the sleeve 24. In this movement the ring gear 55 is stationary and consequently the vehicle in which the transmission is mounted is also stationary.

When it is desired to start the vehicle the brake band 32 is actuated to grip the housing 13 which reduces the rotation and the braking force is transmitted through the elements 27 and 30 and as soon as the velocity of the sleeve 12 with the pinion 21 is less than half of that of the gear 16 the ring gear 55 begins to rotate in a direction opposite to that of the driving shaft 10. In this operation the brake 66 is operated whereby the sleeve 60 and carriers of the pinions 57 are held in stationary positions and with the pinions 57 being turned by the ring gear 55 the sun gear 19 is rotated whereby the driven shaft 11 rotates in the same direction as that of the driving shaft 10 and at three times the velocity. By this means the vehicle starts to move. With continued operation of the transmission the speed continues with the speed or velocity of the driven shaft 11 reaching that of the driving shaft 10, the sleeve 24 being held stationary with the brake band 43.

With the driving shaft 10 and driven shaft 11 rotating at the same speed the gear 84 is actuated so that it engages both of the gears 85 and 86, the governor 95 actuating the rod 93 through the collar 102 and the pin 103. With these parts connected the drive is straight through the transmission, the parts 27 and 30 being inactive and all movable parts turning at the same velocity as that of the driving shaft 10.

As the speed of the vehicle drops the governor 87 withdraws the gear 84 and at the same moment the brake band 66 is tightened whereby the direction of rotation of the ring gear 55 reverses and the speed thereof is reduced.

Upon depressing the accelerator pedal again the brake band 32 is actuated to grip the housing and the cycle of operation is repeated.

The transmission operates similar to a differential as when the gear proportion is less than that of the driving shaft 10 the power of the motor is divided between the movement of the arms 23 and the element 27 and the speed of the car. Consequently the acceleration of the vehicle is constant until the proportion of the velocities of rotation of the driving and driven shafts is less than that of the driving shaft.

It is not necessary to increase the braking force exerted by the member 30 on the member 27 in changing from a stationary condition to a moving condition as when the car or vehicle has a certain speed and the braking force of 30 on 27 is removed the inertia of the mass of the moving vehicle will maintain the momentary velocity of rotation of the arms 23 whereby braking force exerted on the part 27 increases the speed of the vehicle. It is essential to maintain some braking force of the element 30 upon the element 27 as roads are not flat and smooth and some force is necessary to overcome friction in the operating parts.

In the operation of the vehicle and particularly in changing the gear proportion the velocity of rotation of the driving shaft 10 remains constant whereby it is possible to operate a motor driving the unit at its most efficient speed, except when the exerted braking force is excessive and this may be avoided by controlling the parts when the velocity of the driving shaft diminishes all of a sudden.

In driving a vehicle up hill, the gravitation, which endeavors to pull the car backward or down the grade tends to increase the velocity of the elements 23 and at this time the braking force on the element 27 must balance the gravitational force, the power of the engine driving the car up hill with a constant gear proportion at a speed less than that of the driving shaft 10.

Driving the vehicle in reverse is accomplished by loosening the brake 66 and applying brake element 32 and clutch element 75. The vehicle travels in reverse when the braking force of the element 30 is exerted on the element 27.

With the parts assembled in this manner the brake band 32, which is fixedly mounted on the chassis or body of the vehicle is free, the brake band 66 is in gripping relation with the part 63 and the member 75 is free, and when it is desired to start the vehicle moving the brake band 32 is actuated to hold the parts 30 and 12 which slow down the rotation of the parts 23 and 27 and with the brake band 66 holding the planetary gear mounting element 59 the sun gear 19, being actuated by the ring gear 55 and the planetary gear 57, rotates the driven shaft 11. With continued movement of the vehicle the speed increases and with the holding force between the elements 27 and 30 controlled the increase and decrease in speed is smooth and gradual.

It will be understood that modifications, within the scope of the appended claims, may be made in the design and arrangement of the parts without departing from the spirit of the invention.

What is claimed is:

1. A motor vehicle transmission comprising a driving shaft, a driven shaft, a pair of planetary gear assemblies positioned with one assembly on the driving shaft and the other on the driven shaft, a ring gear having an internal gear meshing with pinions of the planetary gear assembly on the driving shaft and a similar internal gear meshing with pinions of the planetary gear assembly on the driven shaft, a fluid type brake positioned to control the travel of the planetary gears of the gear assembly on the driving shaft, manually actuated brakes for controlling rotation of planetary gears of the planetary gear assembly, and governors for meshing the driving shaft with the driven shaft whereby both shafts rotate at the same speed.

2. A motor vehicle transmission comprising a driving shaft, a driven shaft, a pair of planetary gear assemblies positioned with one assembly on the driving shaft and the other on the driven shaft, a ring gear having an internal gear meshing with pinions of the planetary gear assembly on the driving shaft and a similar internal gear meshing with pinions of the planetary gear assembly on the driven shaft, a fluid type brake positioned to control the travel of the planetary gear of the gear assembly on the driving shaft, manually actuated brakes for controlling rotation of planetary gears of the planetary gear assembly, governors for meshing the driving shaft with the driven shaft whereby both shafts rotate at the same speed, and a clutch for securing the planetary gears of the planetary gear assembly on the driven shaft to the driven shaft for reversing the direction of rotation of the driven shaft.

3. In a motor vehicle transmission, the combination which comprises a driving shaft, a driven shaft in alignment with the driving shaft, a planetary gear assembly having a center gear with traveling pinions positioned on the end of the driving shaft, a complementary planetary gear assembly also having a center gear with traveling pinions positioned on the end of the driven shaft adjacent the end of the driving shaft, said planetary gear assemblies being in spaced parallel planes, the ring gear having internal gears in the ends positioned over said planetary gear assemblies with gears meshing with the traveling pinions of said planetary gear assemblies, a sleeve journaled on the driving shaft, means mounting the traveling pinions of the planetary gear assembly on the end of the driving shaft on said sleeve, a fluid type brake assembly positioned around said driving shaft and into which one end of said sleeve extends, a brake element mounted on the end of the sleeve and positioned in said brake assembly, a coacting brake element positioned in the brake assembly, a brake for retaining said coacting brake element in a stationary position, a brake for holding said sleeve in a stationary position, and a brake for holding the traveling planet carriers of the planetary gear assembly of the driven shaft in a stationary position.

4. In a motor driven transmission, the combination which comprises a driving shaft, a driven shaft in alignment with the driving shaft, a planetary gear assembly having a center gear with traveling pinions positioned on the end of the driving shaft, a complementary planetary gear assembly also having a center gear with traveling pinions positioned on the end of the driven shaft adjacent the end of the driving shaft, said planetary gear assemblies being in spaced parallel planes, the ring gear having internal gears in the end positioned over said planetary gear assemblies with gears meshing with the traveling pinions of said planetary gear assemblies, a sleeve journaled on the driving shaft, means mounting the traveling pinions of the planetary gear assembly on the end of the driving shaft on said sleeve, a fluid type brake assembly positioned around said driving shaft and into which one end of said sleeve extends, a brake element mounted on the end of the sleeve and positioned in said brake assembly, a coacting brake element positioned in the brake assembly, a brake for retaining said coacting brake element in a stationary position, a brake for holding said sleeve in a stationary position, a brake for holding the planet carriers of the traveling pinions of the planetary gear assembly of the driven shaft in a stationary position, and a clutch for locking the planet carriers of the traveling pinions of the planetary gear assembly positioned on the driven shaft to said driven shaft.

5. In a motor driven transmission, the combination which comprises a driving shaft, a driven shaft in alignment with the driving shaft, a planetary gear assembly having a center gear with traveling pinions positioned on the end of the driving shaft, a complementary planetary gear assembly also having a center gear with traveling pinions positioned on the end of the driven shaft adjacent the end of the driving shaft, said planetary gear assemblies being in spaced parallel planes, the ring gear having internal gears in the end positioned over said planetary gear assemblies with gears meshing with the traveling pinions of said planetary gear assemblies, a sleeve journaled on the driving shaft, means mounting the traveling pinions of the planetary gear assembly on the end of the driving shaft on said sleeve, a fluid type brake assembly positioned around said driving shaft and into which one end of said sleeve extends, a brake element mounted on the end of the sleeve and positioned in said brake assembly, a coacting brake element positioned in the brake assembly, a brake for retaining said coacting brake element in a stationary position, a brake for holding said sleeve in a stationary position, a brake for holding the planet carriers of the traveling pinions of the planetary gear assembly of the driven shaft in a stationary position, a clutch for locking the planet carriers of the traveling pinions of the planetary gear assembly positioned on the driven shaft to said driven shaft, and a plurality of governors for directly connecting the driven shaft to the driving shaft.

6. In a motor driven transmission, the combination which comprises a driving shaft, a driven shaft in alignment with the driving shaft, a planetary gear assembly having a center gear with traveling pinions positioned on the end of the driving shaft, a complementary planetary gear assembly also having a center gear with traveling pinions positioned on the end of the driven shaft adjacent the end of the driving shaft, said planetary gear assemblies being in spaced parallel planes, the ring gear having internal gears in the end positioned over said planetary gear assemblies with gears meshing with the traveling pinions of said planetary gear assemblies, a sleeve journaled on the driving shaft, means mounting the traveling pinions of the planetary gear assembly on the end of the driving shaft on said sleeve, a fluid type brake assembly positioned around said driving shaft and into which one end of said sleeve extends, a brake element mounted on the end of the sleeve and positioned in said brake assembly, a coacting brake element positioned in the brake assembly, a brake for retaining said coacting brake element in a stationary position, a brake for holding said sleeve in a stationary position, a brake for holding the planet carriers of the traveling pinions of the planetary gear assembly of the driven shaft in a stationary position, a clutch for locking the planet carriers of the traveling pinions of the planetary gear assembly positioned on the driven shaft to said driven shaft, a governor mounted on said sleeve for disconnecting the driving shaft from the driven shaft and a governor mounted on the driving shaft for directly connecting the driving shaft to the driven shaft.

References Cited in the file of this patent

UNITED STATES PATENTS

| | | |
|---|---|---|
| 675,620 | Buffum | June 4, 1901 |
| 2,140,155 | Hale | Dec. 13, 1938 |
| 2,569,981 | Ellor | Oct. 2, 1951 |

FOREIGN PATENTS

| | | |
|---|---|---|
| 768,642 | France | Aug. 10, 1934 |